June 9, 1964 M. E. PHELPS ETAL 3,136,091
TREE INJECTOR
Filed Nov. 2, 1962 3 Sheets-Sheet 2
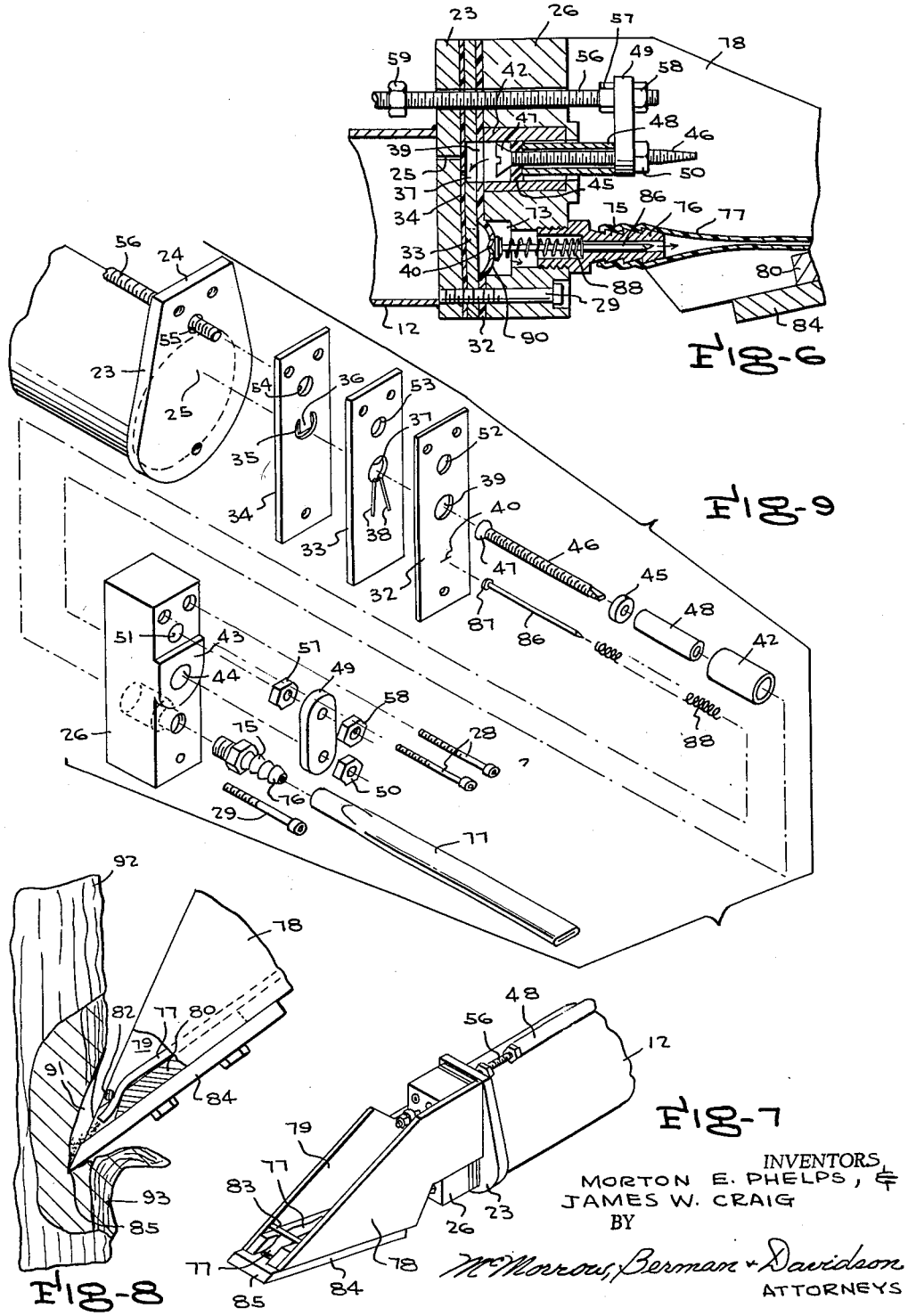
INVENTORS,
MORTON E. PHELPS, &
JAMES W. CRAIG
BY
McMorrow, Berman & Davidson
ATTORNEYS

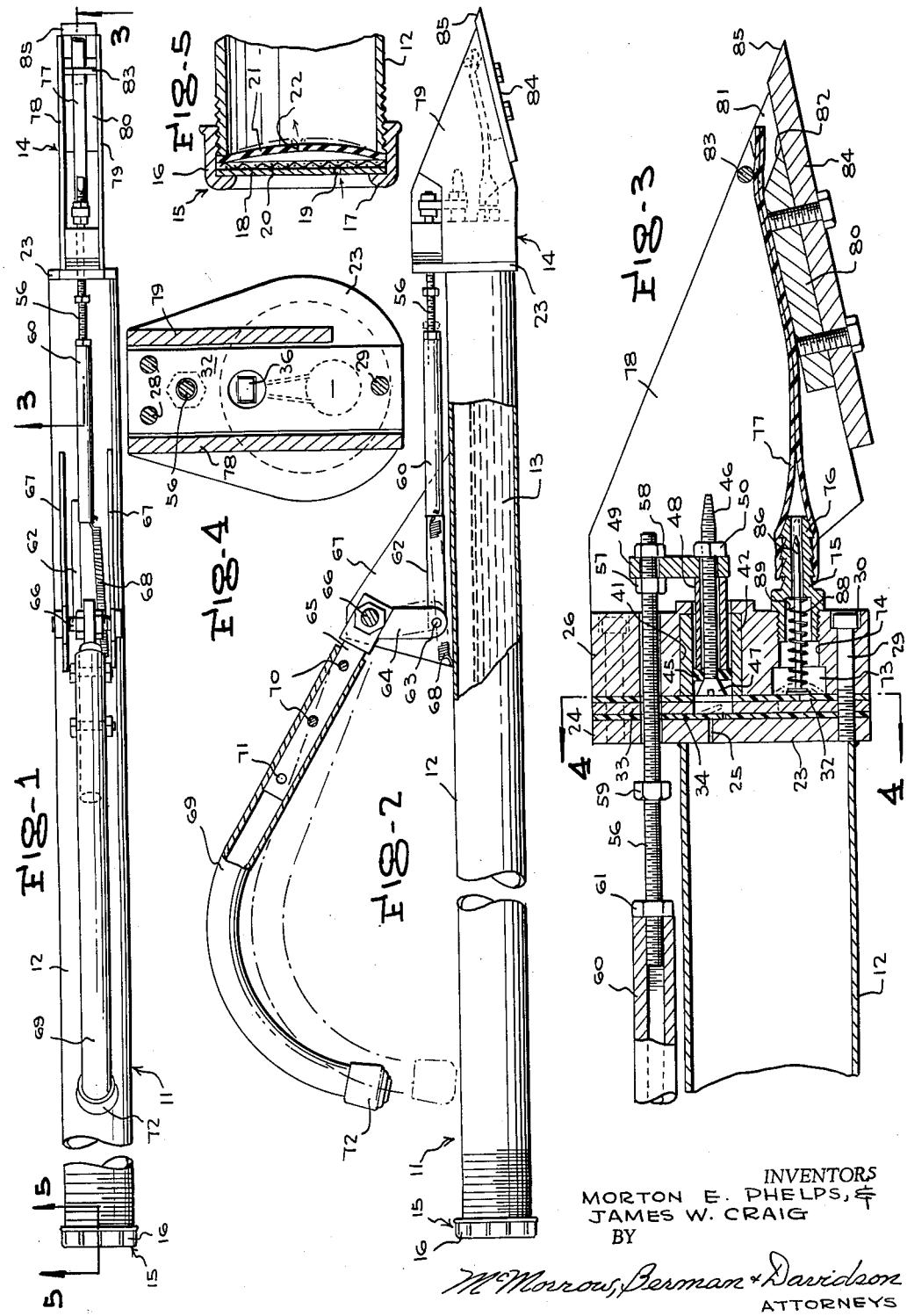

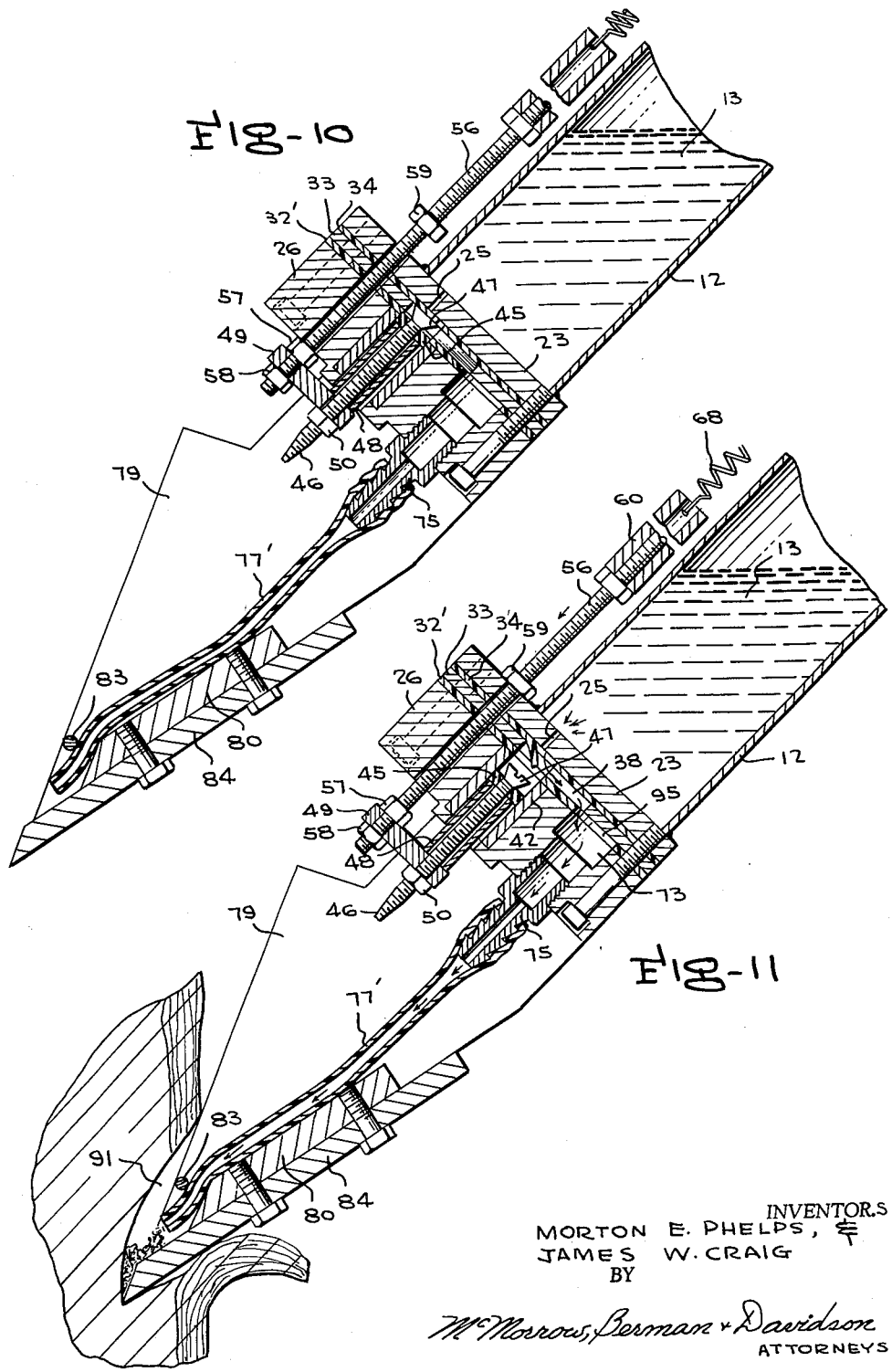

United States Patent Office 3,136,091
Patented June 9, 1964

3,136,091
TREE INJECTOR
Morton E. Phelps, % Phelps Mfg. Co., 715 Thomas St., Little Rock, Ark., and James W. Craig, P.O. Box 8397, 690 S. West St., Jackson, Miss.
Filed Nov. 2, 1962, Ser. No. 235,078
1 Claim. (Cl. 47—57.5)

This invention relates to instruments for injecting chemicals into trees, and more particularly to a device for injecting a measured amount of chemical substance in liquid form, such as poison, into a tree for the purpose of killing the tree.

A main object of the invention is to provide a novel and improved injection device which is relatively simple in construction, which is easy to operate, and which will deliver a measured amount of liquid, such as poison, or the like, into a tree.

A further object of the invention is to provide an improved instrument for cutting a bur in the trunk of a tree and for delivering a measured amount of liquid, such as poison, or the like into the tree, the device being relatively inexpensive to manufacture, being durable in construction, and being compact in size so that it is easy to handle.

A still further object of the invention is to provide an improved injection device for injecting a measured amount of poison in liquid form into a tree, the device being easy to adjust, being arranged so that its blade portion can be easily changed, and being provided with improved valve means which are not affected by the presence of fragments of wood or other foreign material therein.

A still further object of the invention is to provide an improved injection device for delivering a measured amount of poison into the trunk of a tree for the purpose of killing the tree, the device being provided with simple and efficient means for regulating its output, which includes a pump which is accessible externally of the unit and which is protected from damage, and which is protected against leakage.

A still further object of the invention is to provide an improved poison injection device for injecting a measured quantity of liquid poison into the trunk of a tree, said device being provided with a readily replaceable cutting blade for cutting a bur in a tree to define a receiving cavity for the poison, being provided with means for ejecting the poison near the cutting edge of the blade without risk of stoppage due to the presence of chips in or adjacent to the discharge end of the pumping system of the device, which is provided with means for regulating the fit between the piston and cylinder walls of the pump assembly of the device, which includes flexible valves in its pump system which prevent leakage due to the presence of dirt particles or other foreign material, which is arranged to deliver the poison to the bottom of the burrow in the tree without splatter, which carries poison therein without leakage, and which is provided with a combination handle which acts both as a carrier and part of the operating lever system of the device and which is located in a position which is comfortable for these operations as well as capable of being employed to separate limbs to permit the instrument to be pushed into dense undergrowth without snagging.

Further objects and advantages of the invention will become apparent from the following description and claim, and from the accompanying drawings, wherein:

FIGURE 1 is a top plan view of an improved injection device constructed in accordance with the present invention.

FIGURE 2 is a side elevational view, partly in longitudinal cross-section, of the injection device shown in FIGURE 1.

FIGURE 3 is an enlarged longitudinal vertical cross-sectional view taken substantially on the line 3—3 of FIGURE 1.

FIGURE 4 is a transverse vertical cross-sectional view taken substantially on the line 4—4 of FIGURE 3.

FIGURE 5 is an enlarged fragmentary longitudinal vertical cross-sectional view taken substantially on the line 5—5 of FIGURE 1.

FIGURE 6 is an enlarged fragmentary vertical cross-sectional view similar to FIGURE 3, showing the distension of the plastic discharge valve employed in the head portion of the device, during a pumping stroke.

FIGURE 7 is a fragmentary perspective view of the forward portion of the injection device of FIGURES 1 to 6.

FIGURE 8 is a fragmentary enlarged side elevational view, partly in vertical cross-section, showing the manner in which the head portion of the injection device is engaged in the trunk of a tree and illustrating how the liquid poison material is delivered therefrom into the incision formed by the instrument.

FIGURE 9 is an enlarged perspective of the valve elements and associated discharge nozzle of the injection device of FIGURES 1 to 8, the elements being shown in separated positions.

FIGURE 10 is an enlarged vertical cross-sectional view of the head portion of a modified form of injection device constructed in accordance with the present invention, shown in normal position prior to the delivery of liquid therefrom.

FIGURE 11 is a vertical cross-sectional view, similar to FIGURE 10, but showing the head portion of the device engaged in the trunk of a tree and illustrating the positions of the parts during the discharge of liquid from the device to an incision formed in the tree.

Referring to the drawings, and more particularly to FIGURES 1 to 9, 11 generally designates an improved tree injector constructed in accordance with the present invention. The device 11 comprises an elongated rigid barrel 12 which serves as a reservoir for the liquid poison 13, said barrel being provided at its forward end with the injection head assembly, shown generally at 14, and being provided at its rear end with a closeure cap assembly, shown generally at 15.

As shown in FIGURE 5, the closure cap assembly comprises an annular retaining ring 16 which is threadedly engaged on the end of the barrel 12, the ring 16 having the inwardly directed integral flange 17 which clampingly engages against the peripheral portion of a rigid disc member 18, said disc member being formed with a vent aperture 19. Disposed inwardly adjacent the disc 18 is a foraminous screen 20, and disposed between the screen 20 and the rim of the barrel 12 is a flexible plastic disc member 21 formed with a slit 22 in its central portion. The slit 22 is normally closed, but when vacuum develops inside the barrel 12, the external air pressure acts on the flexible disc 21, causing it to be distended inwardly, as shown in dotted view in FIGURE 5, also causing the slit 22 to open so as to allow atmospheric air to enter the barrel. As above mentioned, the slit 22 is closed under normal conditions, so that the poison liquid 13 will not leak from the barrel from the rear end thereof when the barrel is in a horizontal position.

The head portion 14 comprises the transversely extending forward wall 23 which is rigidly secured to the end of the barrel 12 and which is provided with the extension 24 projecting laterally from the barrel. The wall 23 is provided with a small discharge aperture 25. Designated at 26 is a block member which is secured to wall 23 by the pair of upper bolts 28, 28 and the single lower bolt 29 shown in FIGURE 9, the bolts engaging through the block 26 and being threadedly engaged in the wall 23, the block 26 being provided with counterbores 30 receiving the heads of the bolts. Clamped between the block 26 and the end wall 23 are a flexible gasket member 32, of flexible plastic sheet material, or the like, a rigid plate member 33 and a second flexible plastic gasket member 34, which may be made of the same flexible sheet material as the member 32. As shown in FIGURE 9, the members 32, 33 and 34 are substantially the same rectangular shape and are provided with apertures to permit the passage of the bolts 28 and 29.

The members 32, 33 and 34 are of the same transverse cross sectional shape as the block member 26.

The flexible member 34 is formed with a generally U-shaped slot or aperture 35 defining a flexible tongue 36, the aperture 35 being located so that the tongue 36 overlies and serves as a flexible cover flap for the discharge opening 25 in wall 23. The tongue 36 is normally coplanar with the member 34 and therefore sealingly covers aperture 25. However, the tongue 36 is flexible forwardly, namely, to the dotted view position thereof shown in FIGURE 3, when the pressure in passage 25 overbalances the pressure on the forward side of the tongue, as will be presently explained.

The rigid plate member 33 is formed with a generally circular opening 37 and with a pair of downwardly diverging slots 38, 38 communicating with said opening, as shown in FIGURE 9. The flexible plate member 32 is formed with a generally circular opening 39 registering with the opening 37 of the tongue 36. Below the opening 39 the member 32 is formed with a horizontal slit 40 which is normally closed but which opens when the portion of the member 32 around the slit is forwardly distended, for example, as illustrated in FIGURE 6.

Block 26 is provided with a generally cylindrical cavity 41 which is axially aligned with the passage 25, said cavity containing a cylindrical sleeve 42 having an inside diameter substantially the same as that of the aperture 39. As shown in FIGURE 9, the forward side of the block 26 is provided with the boss 43 forming the forward wall of cavity 41, said boss being provided with a central aperture 44 registering with the bore of the sleeve 42.

Sealingly and slidably disposed in the bore of the sleeve 42 is an annular washer member 45 of suitable relatively flexible deformable material, such as soft plastic material, rubber, or the like, which defines a piston member inside the cylindrical sleeve 42. A bolt 46 extends through the central aperture of the annular piston element 45, the bolt having a conical head 47 which may be employed as an expansion wedge to increase the effective diameter of the deformable piston member 45, when desired, in a manner presently to be described.

A rigid sleeve member 48 is provided on the bolt 46 opposite the head 47, as shown in FIGURE 3, the sleeve 48 being located between the annular piston element 45 and a transversely extending rigid bar 49 which is clamped against the end of the sleeve member 48 by a nut 50 threadedly engaged on the bolt 46, as shown in FIGURE 3. By tightening the nut 50 the conical head 47 is caused to exert an expansion force on the annular washer 45, which may be thus caused to increase its effective outside diameter, so that proper compensation for wear of the piston element 45 may be made whenever necessary.

Extending slidably through aligned apertures 51, 52, 53, 54 and 55 formed in the members 26, 32, 33, 34 and 24 is a threaded rod 56 which extends through the top portion of the bar 49 and is clamped thereto by a pair of opposing nuts 57 and 58, as shown in FIGURE 3. An adjustable stop nut 59 is provided on the rod 56 on the side thereof opposite the connection to the bar 49 to limit the forward movement of rod 56.

The rear end of the rod 56 is threadedly secured in the forward end of a rigid tube 60 and is locked thereto by a lock nut 61, as shown in FIGURE 3. Rigidly secured to the opposite end of the tube 60 is a longitudinally extending connecting arm 62 which is pivotally connected at 63 to the depending arm 64 of a lever member 65. Member 65 is pivoted on a transverse bolt 66 between the top ends of a pair of parallel upstanding triangular bracket plates 67, 67 rigidly secured on the barrel 12. A coiled spring 68 connects the left end of tube 60 to the rear portion of one of the bracket plates 67, as shown in FIGURE 2, urging the tube 60 and the bolt 56 connected thereto rearwardly, namely, to the left, as viewed in FIGURES 1 and 2. Therefore, the spring 68 biases the lever 65 in a clockwise direction, as viewed in FIGURE 2.

Adjustably secured on the lever member 65 is an arcuately curved tubular operating handle 69, the handle 69 being fastened to the member 65, which is telescopically received, by transverse securing bolts 70 which extend through selected pairs of apertures 71 provided in the member 65, so that the handle 69 may be adjusted in accordance with the needs of the individual using the device. As shown in FIGURES 1 and 2, the arcuately curved handle portion 69 is coplanar with the barrel 12, the handle 69 being provided at its end with a rubber cap 72 which is engageable with the barrel 12 to limit the rotation of the handle 69 toward the barrel. This likewise limits the stroke of the rod 56. Obviously, by fastening the tubular handle 69 to the arm 65 at different locations along the length of the arm 65, the stroke of the rod 56 may be accordingly adjusted. This provides a rough adjustment of the stroke of the rod 56. Accurate limitation of said stroke is provided, however, by the adjustment of the stop bolt 59.

Outward rotation of handle 69 is limited by the engagement of the inner clamping nut 57 with the block 26.

As will be readily apparent, when the handle 69 is rotated inwardly, namely, toward the dotted view position thereof shown in FIGURE 2, the rod 56 and the bar 49 transmit force to the bolt 46 which causes the bolt to move forwardly, carrying the piston 45 therewith, and developing suction in the rear portion of the bore of sleeve 42, namely, in the space adjacent the flap 36. The unbalance of pressure thus created causes the flap 36 to deflect toward its dotted view position, shown in FIGURE 3, uncovering the apertures 25 and allowing liquid 13 from the barrel 12 to flow into the sleeve 42. When the handle 69 is again moved outwardly, namely, from the dotted view position of FIGURE 2 to its full line position, the direction of movement of the piston 45 is reversed, the piston being then moved to the left, as viewed in FIGURE 3, whereby pressure is applied to the liquid trapped in bore 42 and flap 36, causing the flap to seal off the opening 25. The trapped liquid is thus forced to flow through the slots 38. The slots 38 communicate with a cavity 73 provided in the lower portion of block 26, said cavity being axially aligned with and communicating with a bore 74 formed in said block. A forwardly projecting nozzle 75 is secured in the bore 74, said nozzle having the annularly corrugated tip 76 on which is mounted the elongated flexible normally closed discharge conduit 77.

Rigidly secured to the side edges of the wall 23 are the respective forwardly extending, generally triangular rigid supporting walls 78 and 79, said walls being rigidly connected by a transversely extending bottom wall portion 80. The wall 80 is formed at its forward end with a notch 81 having the downwardly and forwardly inclined transverse edge 82 in which the free end of the discharge conduit 77 is receivable, as shown in FIGURE 3, a transverse pin 83 being secured between the forward portions of the rigid wall members 78 and 79 immediately overlying the free end of the conduit 77 to deflect said free end downwardly into the notch 81, as shown in FIGURE 3.

Secured to the wall 80 is a cutting blade 84 which is provided with the transverse, beveled front cutting edge 85 which is located forwardly adjacent to the notch 81, as is clearly shown in FIGURE 3. As shown in FIGURE 3, the discharge conduit 77 is normally flattened and substantially sealed, sufficient clearance being provided between the inclined edge 82 of the notch and the retaining pin 83 to allow the conduit 77 to be expanded by liquid passing therethrough so as to discharge from the device substantially at the notch 81.

Designated at 86 is a plunger rod which is disposed loosely and slidably in the bore of the nozzle 75, the plunger rod being provided at its rear end with an enlarged head 87 which is urged against the flexible member 32 in overlying relationship to the slit 40 by a coiled spring 88 surrounding the plunger rod 86 and bearing between head 87 and the end wall defined by an enlarged bore portion 89 in nozzle 75. Spring 88 thus acts to urge the portion of member 32 exposed in the space 73 toward a substantially flattened condition wherein the slit 40 is closed.

When liquid is forced through the slot 38 into the space behind the member 32 at the region adjacent the slit 40, the pressure of the liquid distends the member 32 into the space 73, forming a blister 90, shown in FIGURE 6, and causing the slit 40 to open to allow the liquid to pass into space 73 and from thence through the nozzle 75 to the conduit 77. The pressure of the liquid distends the conduit 77, allowing the liquid to pass therethrough and to be discharged into the notch 81 and from thence into the bur 91 of a tree, as will be presently described. In using the device, the blade 84 is engaged in the lower portion of a tree 92 to be destroyed, in the manner illustrated in FIGURE 8, forming a bur or cavity 91 inwardly of the layer of bark 93 of a tree. As illustrated in FIGURE 8, the device must be held at an inclined position in order to form the incision 91. When this has been accomplished, so that the blade 84 is engaged in the incision, as illustrated in FIGURE 8, the handle 69 is moved inwardly to the dotted view position thereof shown in FIGURE 2, causing poison liquid 13 to be forced into the bore of sleeve 42, as above described, after which the handle 69 is rotated outwardly towards its full line position shown in FIGURE 2, whereby the movement of rod 56 is reversed, pumping the liquid through the slots 38, causing the distension of member 32, as above described, and the passage of the liquid into space 73 and through nozzle 75 and conduit 77 so as to be discharged from the notch 81 into the incision 91.

It will be noted that the conduit 77 is normally in a flattened closed position so that ordinarily chips loosened by the cutting action of the edge 85 of blade 84 cannot enter the conduit. If such chips should enter, the flexibility of the conduit 77 is such that the conduit seals itself around the chips or dirt, so that subsequent leakage through the conduit is prevented.

It will be further noted that the flap 36 is normally closed over the opening 25, sealing the liquid 13 in the barrel 12 until suction is developed in the bore of cylinder 42 by the operation of handle 69, as above described.

In the modified form of the invention illustrated in FIGURES 10 and 11, the flexible gasket member, shown at 32', which is interposed between the rigid plate member 33 and the block 26 is formed with a circular aperture 95 instead of with the normally closed slit 40, so that direct communication is established between the space 73 and the slots 38. Furthermore, in this form of the invention, the discharge conduit, shown at 77', is normally open and need not be inflated to allow liquid to pass therethrough. Therefore, in the operation of the form of the invention shown in FIGURES 10 and 11, the poison liquid 13 is first drawn into the cylindrical sleeve 42 by the inward movement of the handle 69, similar to the operation of the first-described form of the invention, after which the liquid freely flows by gravity through the slots 38 and the passage 95 into the space 73, and from thence through the conduit 77' into the incision 91. The liquid can be forcibly injected by moving the handle 69 outwardly from the dotted view position thereof shown in FIGURE 2, namely, by providing a pumping stroke of rod 56, which is transmitted to the pump piston member 45 as in the first-described form of the invention.

The flexible tube 77 or 77' may be lifted out of the notch 81 and disengaged from beneath the retaining bolt 83 to allow the end of the tube to be received in a graduated cylinder to catch the liquid and measure the amount of discharge, so that the device may be calibrated. The ability to easily lift out the flexible tube for purposes of calibration and to thereafter return the flexible tube to its working position represents an important advantage over prior art devices employing rigid discharge tubes.

While certain specific embodiments of an improved device for injecting chemical poison liquid into a tree have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A tree injector adapted to dispense a measured quantity of liquid, the tree injector comprising:
- an elongated barrel comprising a container for the liquid, the barrel having opposite ends;
- closure means, having a pressure responsive air inlet formed therein, on one of the ends, and an end wall having a discharge aperture formed therein on the other end;
- a head on said other end of the barrel, the head having a guide channel therein and having supporting walls on each side of the channel;
- an incision forming cutting blade mounted on the head adjacent the channel;
- handle means pivotally mounted to the barrel for inward and outward movement with respect thereto;
- a pump and cylinder assembly on the head, the pump and cylinder assembly including a piston;
- means connecting the piston and the handle;
- a first flexible gasket member interposed between the pump and cylinder assembly and the end wall and having a flexible valve flap normally overlying and covering the aperture of the end wall and opening responsive to a suction stroke of the piston upon the inward movement of the handle;
- a second flexible member interposed between the first flexible gasket member and the pump and cylinder assembly and having a distensible portion with a normally closed slit formed therein;
- means communicatively connecting the cylinder and the distensible portion; and
- a flexible conduit disposed in the channel of the head and arranged to transmit the liquid from the distensible portion.

References Cited in the file of this patent

UNITED STATES PATENTS

| 1,122,868 | Davis | Dec. 29, 1914 |
| 1,407,689 | Batterson | Feb. 28, 1922 |
| 2,355,732 | Jepsen | Aug. 15, 1944 |
| 2,392,085 | Ferrel | Jan. 1, 1946 |